United States Patent
Kwon et al.

(10) Patent No.: US 10,616,124 B2
(45) Date of Patent: *Apr. 7, 2020

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Woosuk Kwon, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,154

(22) Filed: Jan. 30, 2019

(65) Prior Publication Data

US 2019/0166060 A1 May 30, 2019

Related U.S. Application Data

(63) Continuation of application No. 15/115,885, filed as application No. PCT/KR2016/005901 on Jun. 3, 2016, now Pat. No. 10,237,196.

(Continued)

(51) Int. Cl.
*H04L 29/06* (2006.01)
*H04L 12/823* (2013.01)
(Continued)

(52) U.S. Cl.
CPC .............. *H04L 47/32* (2013.01); *H04L 12/18* (2013.01); *H04L 69/22* (2013.01);
(Continued)

(58) Field of Classification Search
None
See application file for complete search history.

(56) References Cited

U.S. PATENT DOCUMENTS

2007/0130498 A1  6/2007  Hannuksela et al.
2008/0275905 A1  11/2008  Hannuksela
(Continued)

FOREIGN PATENT DOCUMENTS

CN  101904153 A  12/2010
EP    2362654 A1   8/2011
(Continued)

OTHER PUBLICATIONS

"Digital Video Broadcasting (DVB); Generic Stream Encapsulation (GSE); Part 1: Protocol," ETSI TS 102 606-1, V1.2.1, XP014214603, Jul. 2014, pp. 1-36.

(Continued)

*Primary Examiner* — Brandon M Renner
(74) *Attorney, Agent, or Firm* — Birch, Stewart, Kolasch & Birch, LLP

(57) ABSTRACT

A method for processing input data in a transmitter is discussed. The method includes processing a link layer packet. Further, the link layer packet includes a header and a payload, the header includes a base header, the base header includes packet type information for representing a first packet type, and segmentation concatenation information for representing that the payload carries a segment of a single input packet or multiple input packets, in response to the packet type information for a packet type extension, the header further includes an additional header for type extension, the additional header for type extension includes extended type information for representing a second packet type, and the extended type information is used for the second packet type different from the first packet type which is represented by the packet type information, and in (Continued)

response to the payload carrying the multiple input packets, the header further includes an additional header for concatenation, the additional header for concatenation includes count information for representing a number of the multiple input packets included in the link layer packet, and a value of the count information is set to a number of the multiple input packets included in the link layer packet subtracted by two; and transmitting a broadcast signal based on the link layer packet.

5 Claims, 27 Drawing Sheets

Related U.S. Application Data

(60) Provisional application No. 62/180,018, filed on Jun. 15, 2015, provisional application No. 62/174,534, filed on Jun. 12, 2015, provisional application No. 62/171,227, filed on Jun. 4, 2015.

(51) Int. Cl.
*H04N 21/2362* (2011.01)
*H04N 21/2381* (2011.01)
*H04N 21/438* (2011.01)
*H04L 12/18* (2006.01)

(52) U.S. Cl.
CPC ..... *H04N 21/2362* (2013.01); *H04N 21/2381* (2013.01); *H04N 21/438* (2013.01)

(56) References Cited

U.S. PATENT DOCUMENTS

| | | | |
|---|---|---|---|
| 2009/0055417 A1 | 2/2009 | Hannuksela | |
| 2011/0299443 A1 | 12/2011 | Lee et al. | |
| 2013/0125186 A1 | 5/2013 | Lee et al. | |
| 2015/0092881 A1 | 4/2015 | Hwang et al. | |
| 2015/0124831 A1* | 5/2015 | Kumar | H04L 69/22 |
| | | | 370/393 |
| 2015/0237175 A1 | 8/2015 | Michael | |
| 2016/0164635 A1 | 6/2016 | Moon et al. | |
| 2017/0013028 A1* | 1/2017 | Yang | H04N 21/2343 |
| 2017/0041156 A1 | 2/2017 | Han et al. | |
| 2017/0373918 A1* | 12/2017 | Kwak | H04L 67/02 |

FOREIGN PATENT DOCUMENTS

| | | |
|---|---|---|
| EP | 2 378 678 A2 | 10/2011 |
| EP | 3026918 A1 | 6/2016 |
| EP | 3043531 A1 | 7/2016 |
| KR | 10-2008-0072019 A | 8/2008 |
| KR | 10-2010-0028546 A | 3/2010 |
| WO | WO 2010/082768 A2 | 7/2010 |
| WO | WO 2012/011722 A2 | 1/2012 |
| WO | WO 2015/008983 A1 | 1/2015 |
| WO | WO 2015/046836 A1 | 4/2015 |
| WO | WO 2015/064942 A1 | 5/2015 |

OTHER PUBLICATIONS

"Digital Video Broadcasting (DVB); Generic Stream Encapsulation (GSE); Part 2: Logical Link Control (LLC)," ETSI TS 102 606-2, V1.1.1, XP014214604, Jul. 2014, pp. 1-40.
ATSC, "ATSC Candidate Standard: Link-Layer Protocol (A/330)," Doc. S33-169r2, XP017848750, Dec. 25, 2015, pp. 1-42.
Chinese Office Action and Search Report dated Dec. 24, 2018 for Application No. 201680000833.5.

\* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|         SLT | var | Sec. 6.3 |
|         break; | | |
|      case 0x02: | | |
|         RRT | var | See Annex F |
|         break; | | |
|      case 0x03: | | |
|         System Time | var | Sec. 6.4 |
|         break; | | |
|      case 0x04: | | |
|         CAP | var | Sec. 6.5 |
|         break; | | |
|      default: | | |
|         reserved | var | |
|    } | | |
| } | | | t3010

| Element or Attribute Name | | | Use | Data Type |
|---|---|---|---|---|
| SLT | | | | |
| | @bsid | | 1 | unsignedShort |
| | @sltCapabilities | | 0..1 | string |
| | sltInetUrl | | 0..1 | anyURL |
| | | @urlType | 1 | unsignedByte |
| | Service | | 1..N | |
| | | @serviceID | 1 | unsignedShort |
| | | @sltSvcSeqNum | 1 | unsignedByte |
| | | @protected | 0..1 | boolean |
| | | @majorChannelNo | 0..1 | 1...999 |
| | | @minorChannelNo | 0..1 | 1...999 |
| | | @serviceCategory | 1 | unsignedByte |
| | | @shortServiceName | 0..1 | string |
| | | @hidden | 0..1 | boolean |
| | | @broadbandAccessRequired | 0..1 | boolean |
| | | @svcCapabilities | 0..1 | string |
| | | BroadcastSvcCignaling | 0..1 | |
| | |   @slsProtocol | 1 | unsignedByte |
| | |   @slsMajorProtocolVersion | 1 | unsignedByte |
| | |   @slsMinorProtocolVersion | 1 | unsignedByte |
| | |   @slsPlpID | 0..1 | unsignedByte |
| | |   @slsDestinationIpAddress | 1 | string |
| | |   @slsDestinationUdpPort | 1 | unsignedShort |
| | |   @slsSourceIpAddress | 1 | string |
| | | svcInetUrl | 0..N | anyURL |
| | |   @urlType | 1 | unsignedByte | t3020

FIG. 4

| Element or Attribute Name | | | | | | Use | Data Type |
|---|---|---|---|---|---|---|---|
| bundleDescription | | | | | | | |
| | userServiceDescription | | | | | | |
| | | @globalServiceID | | | | 1 | anyURL |
| | | @serviceID | | | | 1 | unsignedShort |
| | | @serviceStatus | | | | 0..1 | boolean |
| | | @fullMPDUri | | | | 1 | anyURL |
| | | @sTSIDUri | | | | 1 | anyURL |
| | | name | | | | 0..N | string |
| | | | @lang | | | 1 | language |
| | | serviceLanguage | | | | 0..N | language |
| | | capabilityCode | | | | 0..1 | string |
| | | deliveryMethod | | | | 1..N | |
| | | | broadcastAppService | | | 1..N | |
| | | | | basePattern | | 1..N | string |
| | | | unicastAppService | | | 0..N | |
| | | | | basePattern | | 1..N | string |

— t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | ScrFlow | 0..1 | scrFlowType |
| | | RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
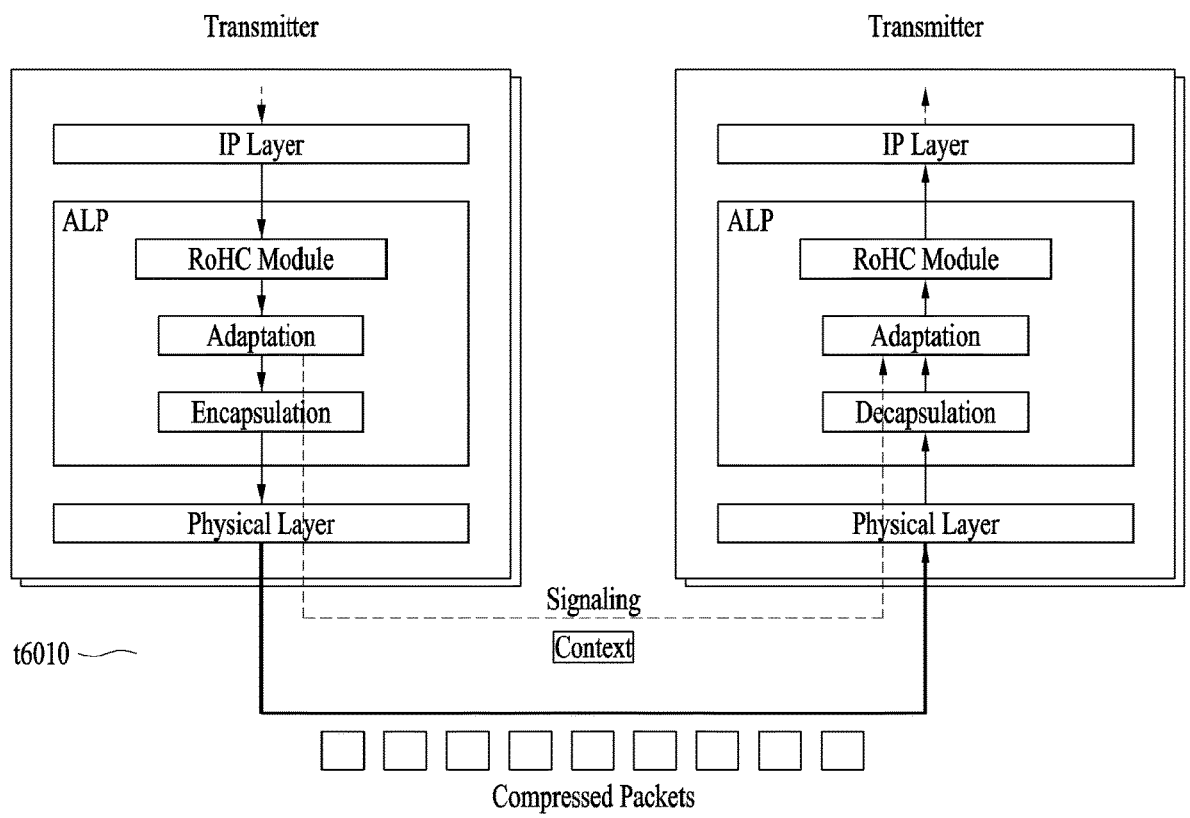
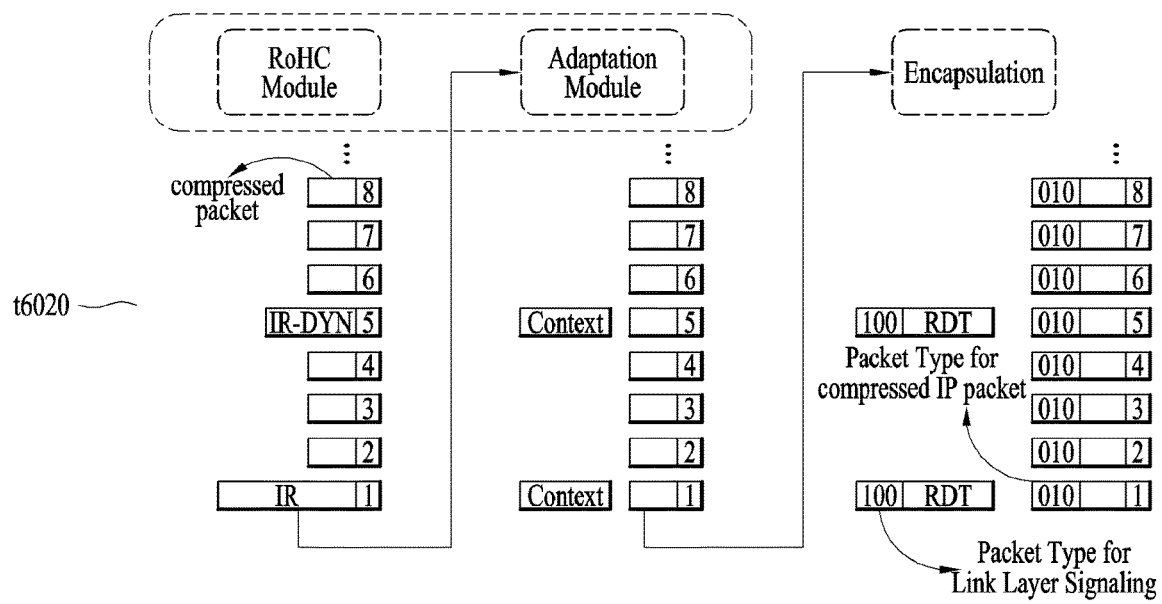

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i + +) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag = = "1") { | | |
|             SID | 8 | uimsbf |
|         } | | |
|         if (compressed_flag = = "1') { | | |
|             context_id | 8 | uimsbf |
|         } | | |
|     } | | |
| } | | |

FIG. 12

| Syntax | Number of bits | Mnemonic |
|---|---|---|
| ALP_Packet_Header() { | | |
|     Packet_Type | 3 | uimsbf |
|     Payload_Configuration | 1 | bslbf |
|     if (Payload_Configuration =="0") { | | |
|         Header_Mode | 1 | uimsbf |
|         Length | 11 | bslbf |
|         if (Header_Mode =="1") { | | |
|             Additional_Header_for_Single_Packet() | var | |
|         } | | |
|     } | | |
|     else if (Payload_Config =="1"){ | | |
|         Segmentation_Concatenation | 1 | uimsbf |
|         Length | 11 | bslbf |
|         if (Segmentation_Concatenation =="0") { | | |
|             Additional_Header_for_Segmentation() | var | |
|         } | | |
|         else if (Segmentation_Concatenation =="1") { | | |
|             Additional_Header_for_Concatenation() | var | |
|         } | | |
|     } | | |
| } | | |

| Packet_Type Value | Meaning |
|---|---|
| 000 | IPv4 packet |
| 001 | Compressed IP packet |
| 010 | MPEG-2 Transport Stream |
| 011 | Reserved |
| 100 | Link layer signaling packet |
| 101 | Reserved |
| 110 | Reserved |
| 111 | Packet Type Extension |

FIG. 13

| Length_MSB (5b) | R (1b) | SIF (1b) | HEF (1b) |

| Syntax | Number of bits | Mnemonic |
| --- | --- | --- |
| Additional_Header_for_long_Packet () { | | |
|     Length_MSB | 5 | uimsbf |
|     reserved | 1 | bslbf |
|     SIF | 1 | bslbf |
|     HEF | 1 | bslbf |
|     if(SIF=="1") { | | |
|         SID | 8 | bslbf |
|     } | | |
|     if (HEF =="1") { | | |
|         Header_Extension () | var | |
|     } | | |
| } | | |

FIG. 14

| Seg_SN (5b) | LSI (1b) | SIF (1b) | HEF (1b) |
|---|---|---|---|

| Syntax | Number of bits | Mnemonic |
|---|---|---|
| Additional_Header_for_Segmentation (){ | | |
|     Segment_Sequence_Number | 5 | |
|     Last_Segment_Indicator | 1 | |
|     SIF | 1 | bslbf |
|     HEF | 1 | bslbf |
|     if(SIF=="1") { | | |
|         SID | 8 | bslbf |
|     } | | |
|     if (HEF =="1") { | | |
|         Header_Extension () | var | |
|     } | | |
| } | | |

| Syntax | Number of bits | Mnemonic |
|---|---|---|
| Additional_Header_for_Concatenation (){<br>    Length_MSB<br>    Count<br>    HEF<br>    for(i=0; i<Count-1; i++) {<br>        Component_Length<br>    }<br>    if (HEF =="1") {<br>        Header_Extension ()<br>    }<br>} | | |

| Syntax | Number of bits | Mnemonic |
|---|---|---|
| ATSC3.0_Link_Layer_Packet() { | | |
|     Packet_Type | 3 | '010' |
|     NUMTS | 4 | uimsbf |
|     AHF | 1 | bslbf |
|     if (AHF =="1") { | | |
|         HDM | 1 | bslbf |
|         DNP | 7 | uimsbf |
|     } | | |
| } | | |

FIG. 21
(a) 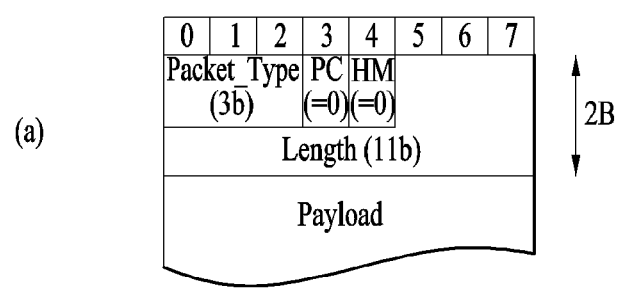
(b) 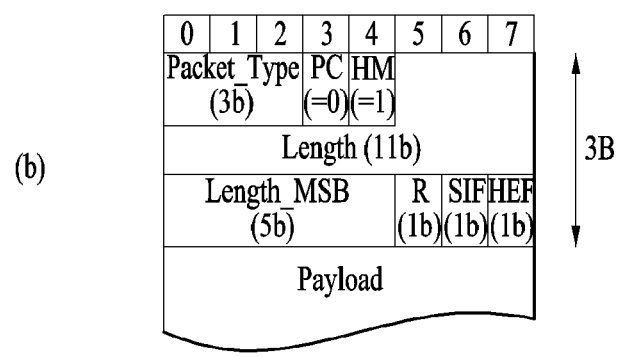

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS-REFERENCE TO RELATED APPLICATIONS

This Application is a Continuation of U.S. patent application Ser. No. 15/115,885 filed on Aug. 1, 2016, which is the National Phase of PCT International Application No. PCT/KR2016/005901 filed on Jun. 3, 2016, which claims the priority benefit under 35 U.S.C. § 119(e) to U.S. Provisional Application Nos. 62/180,018 filed on Jun. 15, 2015, 62/174,534 filed on Jun. 12, 2015 and 62/171,227 filed on Jun. 4, 2015, all of which are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

SUMMARY OF THE INVENTION

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

The present invention proposes a system for effectively supporting future broadcast services in an environment supporting future hybrid broadcast using terrestrial broadcast networks and the Internet and related signaling methods, as included and roughly described herein according to the purpose of the present invention.

According to the present invention, the amount of data transmitted between a transmitter and a receiver of a broadcast system can be efficiently reduced.

According to the present invention, broadcast signals can be efficiently delivered from the transmitter to the receiver irrespective of a protocol used in a higher layer of the broadcast system.

BRIEF DESCRIPTION OF THE DRAWINGS

The accompanying drawings, which are included to provide a further understanding of the invention, illustrate embodiments of the invention and together with the description serve to explain the principle of the invention.

FIG. 3 illustrates a low level signaling (LLS) table and a service list table (SLT) according to an embodiment of the present invention.

FIG. 4 illustrates a USBD and an S-TSID delivered through ROUTE according to an embodiment of the present invention.

FIG. 5 illustrates a USBD delivered through MMT according to an embodiment of the present invention.

FIG. 6 illustrates a link layer operation according to an embodiment of the present invention.

FIG. 7 illustrates a link mapping table (LMT) according to an embodiment of the present invention.

FIG. 12 illustrates a syntax of a link layer packet header according to an embodiment of the present invention.

FIG. 13 illustrates a structure and syntax of an additional header for a single packet according to an embodiment of the present invention.

FIG. 14 illustrates a structure and syntax of an additional header of a link layer packet in the case of segmentation according to an embodiment of the present invention.

FIG. 21 illustrates a single packet encapsulation structure of a link layer according to an embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc. The present invention proposes a physical profile (or system) optimized to minimize receiver complexity while accomplishing performance required for a specific purpose.

Figure 1:
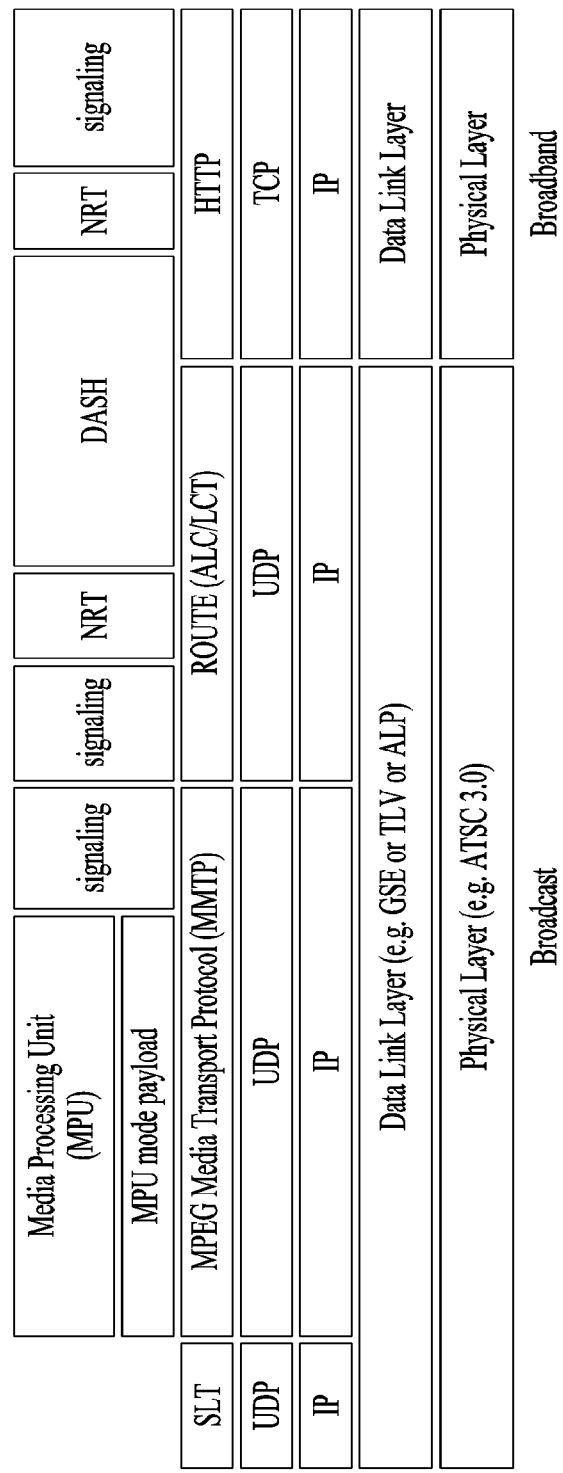
FIG. 1 illustrates a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
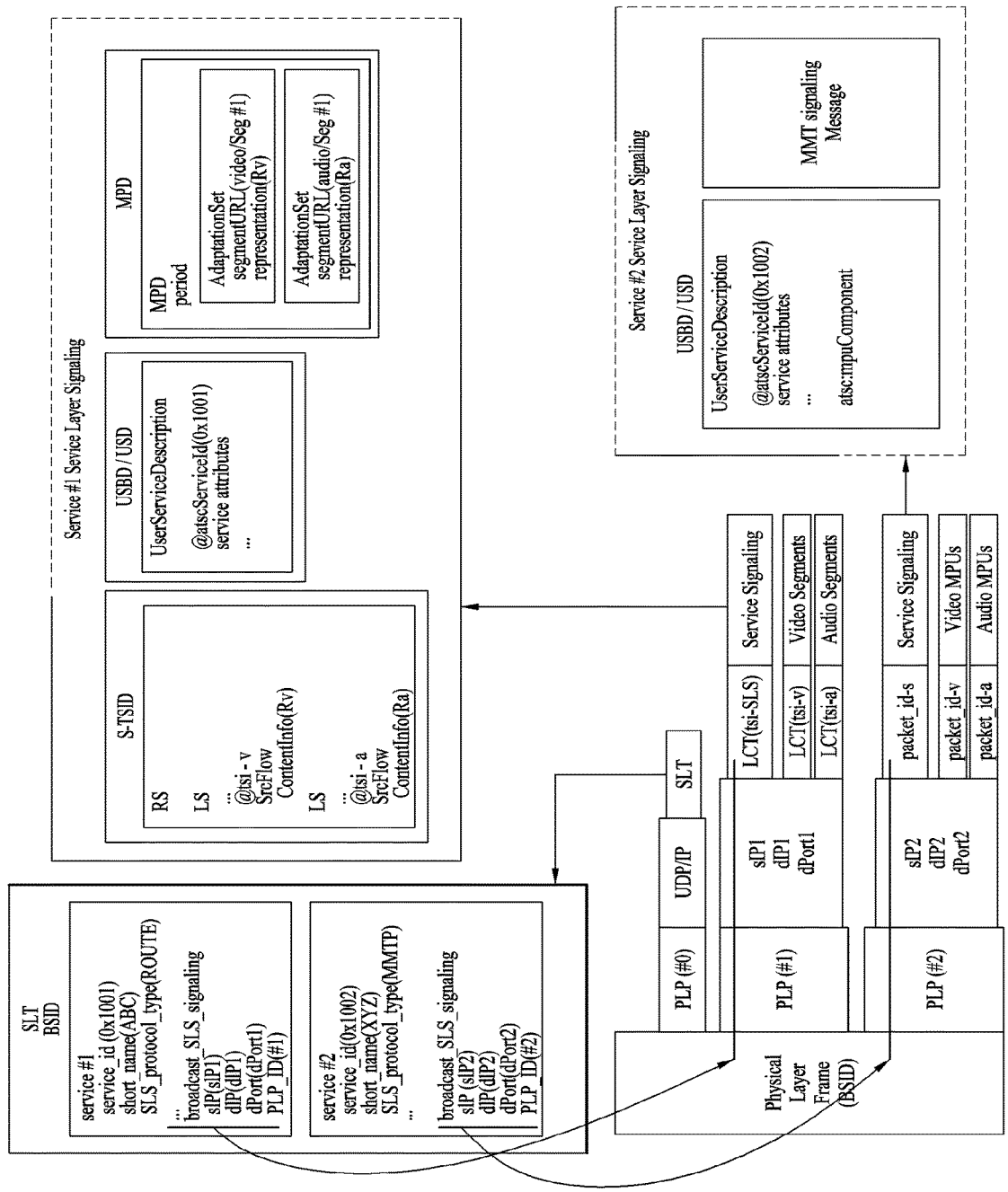
FIG. 2 illustrates a service discovery procedure according to an embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an AsIpAddr attribute, an AdIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The AsIpAddr attribute, the AdIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @service-Genre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
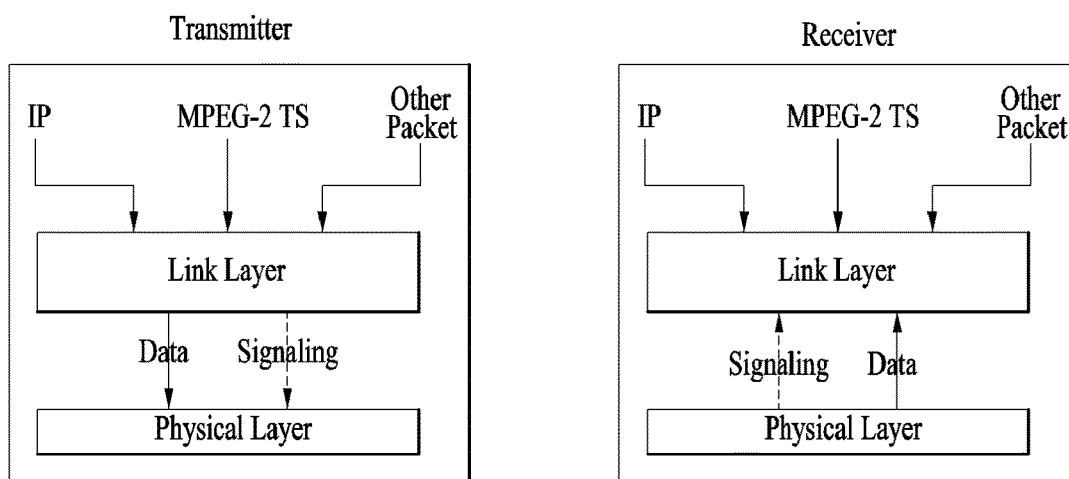
FIG. 8 illustrates data processing in a link layer according to an embodiment of the present invention.

FIG. 8 illustrates data processing in a link layer according to an embodiment of the present invention.

The link layer may correspond to a protocol that processes data between a physical layer and a network layer. Refer to the OSI 7 layer model for a description of each layer. Data processing in the link layer in a transmitter may include a procedure for processing data delivered from the network layer (higher layer of the physical layer) and delivering the processed data to the physical layer. Data processing in the link layer in a receiver may include a procedure for processing data from the physical layer and delivering the processed data to the network layer. The purpose of data processing in the link layer is to process packets from a higher layer into a single format that can be processed in the physical layer. The purpose of data processing in the link layer is to secure scalability and flexibility for processing types of input packets from a higher layer, which have not been defined but may be defined in the future, in broadcast systems. The purpose of data processing in the link layer is to process input data (input packets: packets delivered from a higher layer of the link layer to the link layer from the viewpoint of the transmitter) such that the input data can be efficiently transmitted. For example, data processing in the link layer may include a procedure for compressing or removing redundant information in headers of input packets. Processing in the link layer, defined in a broadcast system according to the present embodiment, may be referred to as an ATSC link layer protocol (ALP) (a link layer protocol hereinafter) and packets including data processed through the ALP may be referred to as ALP packets.

Referring to the figure showing processing at the transmitter, the higher layer of the link layer may deliver IP, MPEG2-TS and/or other packets to the link layer. The link layer may process data and/or packets delivered from the higher layer into ALP packets (link layer packets). During this procedure, data (referred to as media data hereinafter) used for presentation of a service and/or content and signaling information including information necessary to appropriately acquire the data may be generated. The ALP packets may include the media data and/or the signaling information. The ALP packets may be generated in a format that can be processed in the physical layer. Accordingly, the broadcast system may transmit the data/packets delivered from the higher layer of the link layer from the transmitter to the receiver through the physical layer irrespective of the protocol to which the data/packet conforms.

Referring to the figure showing processing in the receiver, the broadcast system receives a service signal (a broadcast signal and/or a broadband signal) in the physical layer and extracts one or more ALP packets including the media data and/or the signaling information. The broadcast system may restore the data and/or packets of the higher layer of the link layer in the link layer through a reverse of the data processing procedure performed by the transmitter. The broadcast system may process the data and/or packets according to the protocol of the higher layer and provide a service and/or content to viewers.

Processing in the link layer may include all or part of the aforementioned overhead reduction, IP overhead removal, MPEG2-TS overhead removal, packet encapsulation, concatenation and segmentation processes.

Figure 9:
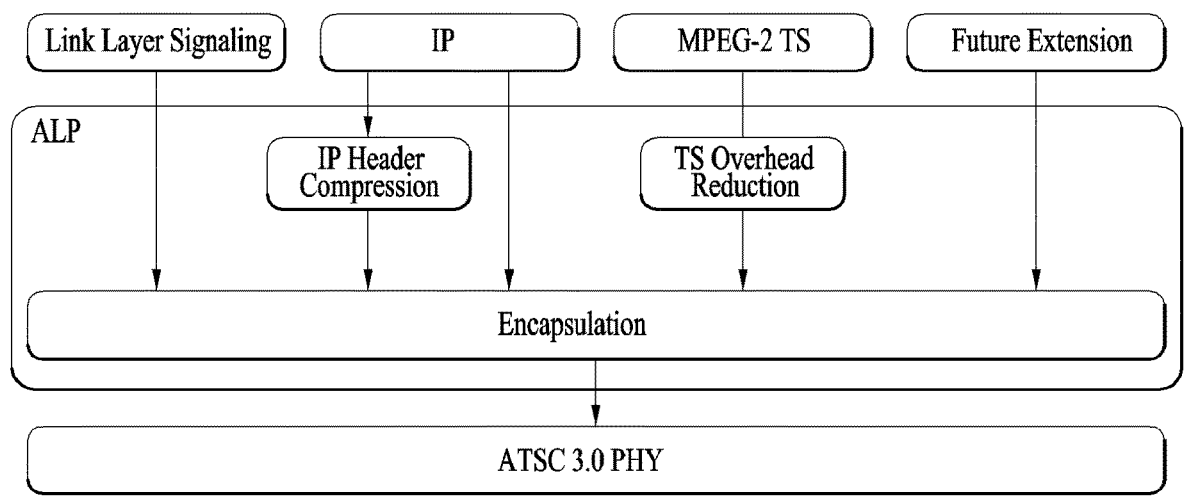
FIG. 9 illustrates an ALP structure and an interface according to an embodiment of the present invention.

FIG. 9 illustrates an ALP structure and an interface according to an embodiment of the present invention.

As described above, the ALP processes network layer packets such as IPv4 and MPEG2-TS packets as input packets. IPv4 is a protocol mainly used in communication environments and MPEG2-TS is a protocol mainly used in broadcast environments. As described above, processing in the link layer may provide scalability and flexibility for processing packets based on a third protocol in addition to packets based on the aforementioned two protocols. The ALP may specify signaling and packets for link layer signaling. Link layer signaling may include information for mapping between a specific channel or multicast (which may be defined as a data set provided by the broadcast system for purposes in a specific range) and the physical layer. Link layer signaling may include information necessary to restore the aforementioned overhead-removed (or compressed) packets in the receiver.

Figure 10:
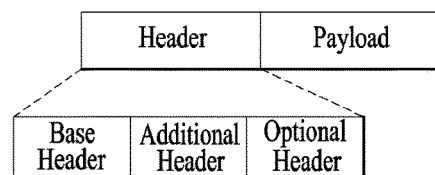
FIG. 10 illustrates a format of a link layer packet according to an embodiment of the present invention.

FIG. 10 illustrates a link layer packet format according to an embodiment of the present invention.

The link layer packet may include a header and a payload (payload including data). The header of the link layer packet may include a base header, an additional header and/or an optional header. The additional header may be included or may not be included in the header of the link layer packet according to control fields (information) included in the base header. Presence or absence of the optional header may be indicated by a flag field (information) of the additional header. A field indicating presence of the additional header and the optional header may be located in the base header.

Figure 11:
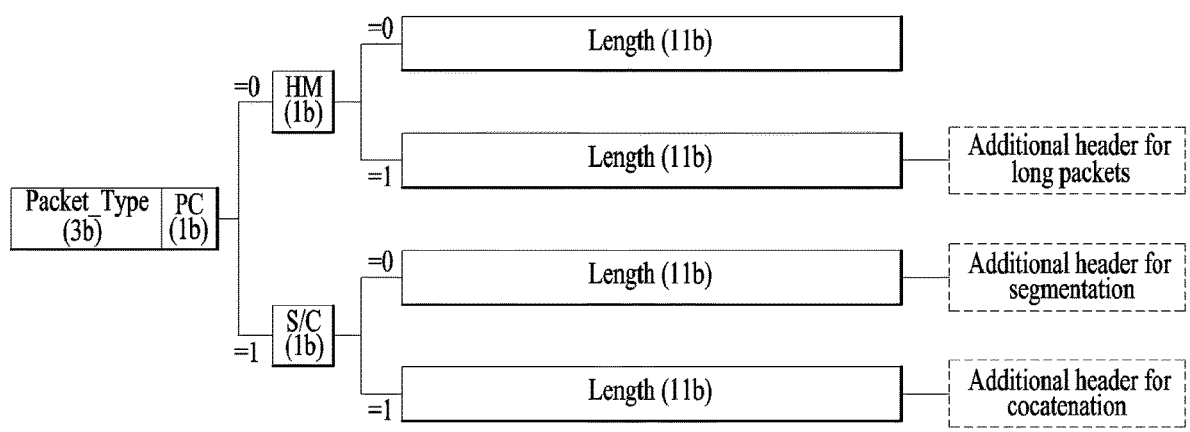
FIG. 11 illustrates a base header structure of a link layer packet according to an embodiment of the present invention.

FIG. 11 illustrates a base header structure of the link layer packet according to an embodiment of the present invention. A description will be given of the header structure.

The structure of the base header is described. The base header with respect to link layer packet encapsulation has a hierarchical structure. The base header may have a length of 2 bytes, which corresponds to the minimum length of the link layer packet header.

The base header according to an embodiment of the present invention may include a Packet_Type field, a PC field and/or a length field. The base header may further include an HM field or an S/C field according to embodiments.

Positions of the fields included in the base header are as shown in the figure and may be changed in the base header or in the header of the link layer packet.

FIG. 12 illustrates a syntax of the link layer packet header according to an embodiment of the present invention.

The link layer packet header may include a Packet_Type field, a Payload_Configuration (PC) field, a Header_Mode (HM) field, a Segmentation_Concatenation (S/C) field, a length field, Additional_Header_For_Single_Packet, Additional_Header_For_Segmentation_Packet and/or Additional_Header_For_Concatenation_Packet.

The Packet_Type field is a 3-bit field that indicates the packet type of input data before being encapsulated into a link layer packet or the original protocol. IPv4 packets, compressed IP packets, link layer signaling packets and other packets may be encapsulated in this base header structure. However, MPEG-2 TS packets may be encapsulated in a special structure different from the aforementioned structure according to embodiment. When the Packet_Type is "000", the original data type of ALP packets, "001", "100" or "111", corresponds to one of the IPv4 packet, compressed IP packet, link layer signaling and an extension packet. When MPEG-2 TS packets are encapsulated, the Packet_Type can be "010". Other Packet_Type field values may be reserved for future use.

The Payload_Configuration (PC) field may be a 1-bit field indicating a payload configuration. A Payload_Configuration (PC) field value of 0 may indicate that the link layer packet delivers a single input packet and the next field is Header_Mode. A Payload_Configuration (PC) field value of 1 may indicate that the link layer packet delivers one or more input packets (concatenation) or part of a single large input packet (segmentation) and the next field is Segmentation_Concatenation.

The Header_Mode (HM) field is a 1-bit field indicating that no additional field is present and the length of the payload of the link layer packet is less than 2048 bytes when set to 0. This numerical value may be changed according to embodiment. A Header_Mode (HM) field value of 1 may indicate that the additional header for a single packet, defined in the following, follows the length field. In this case, the payload length may be greater than 2047 bytes and/or option features may be used (sub-stream identification, header extension, etc.). This numerical value may be changed according to embodiment. The HM field may be present only when the Payload_Configuration field of the link layer packet is 0.

The Segmentation_Concatenation (S/C) field may be a 1-bit field indicating that the payload delivers segments of the input packet and the additional header for segmentation, defined in the following, follows the length field when set to 0. A Segmentation_Concatenation (S/C) field of 1 may indicate that the payload delivers two or more complete input packets and the additional header for concatenation, defined in the following, follows the length field. The S/C field may be present only when the Payload_Configuration field of the ALP packet is 1.

The length field may be an 11-bit field indicating 11 least significant bits (LSBs) corresponding to the length, in bytes, of the payload delivered by the link layer packet. When the following additional header includes a Length_MSB field, the length field is concatenated to the Length_MSB field and becomes LSBs to provide the total length of the payload. The number of bits of the length field may be changed from 11 bits.

The Additional_Header_For_Segmentation_Packet and/or the Additional_Header_For_Concatenation_Packet will be described in detail later.

The packet according to an embodiment of the present invention may correspond to the following packet types. That is, the packet may be a single packet having no additional header, a single packet having an additional header, a segmented packet and a concatenated packet. More packet types may be configured according to combinations of the additional header, the optional header, an additional header for signaling information and an additional header for type extension, which will be described later.

FIG. 13 illustrates a structure and syntax of an additional header for a single packet according to an embodiment of the present invention.

Various types of additional headers may be present. An additional header for a single packet will now be described.

An additional header for a single packet may be present when Header_Mode (HM)="1". When the length of the payload of the link layer packet is greater than 2,047 bytes or an optional field is used, Header_Mode (HM) may be set to 1.

The additional header for a single packet may include a Length_MSB field, a Sub-stream Identifier Flag (SIF) field, an HEF field, an SID field and/or Header_Extension.

The Length_MSB field may be a 5-bit field indicating MSBs of the total payload length in bytes in a current link layer packet and is concatenated to a length field including 11 LSBs to obtain the total payload length. Accordingly, the maximum length of a payload that can be signaled is 65,535 bytes. The number of bits of the length field may be changed from 11 bits. The number of bits of the Length_MSB field may be changed, and thus a presentable maximum payload length may also be changed. Each length field may indicate the length of the entire link layer packet instead of the payload according to embodiment.

The SIF field may be a 1-bit field indicating whether the SID (sub-stream ID) field follows the HEF (Header Extension Flag) field. When the link layer packet does not include the SID, the SIF field may be set to 0. When the SID follows the HEF field in the link layer packet, the SIF field may be set to 1. The SID will be described in detail layer.

The HEF field may be a 1-bit field indicating presence of a header for future extension when set to 1. An HEF field value of 0 may indicate that the extension header is not present.

The SID field may be an 8-bit field indicating a sub-stream ID with respect to the link layer packet. The SID field may be used to filter a specific packet stream at the link layer level. The SID field may identify a sub-stream including link layer packets carrying specific multicast. Mapping between sub-streams and SID field values may be included in link layer signaling and/or higher layer signaling information (e.g., SLT and/or SLS). In one embodiment, the SID field may serve as a service identifier in a single ALP stream. When optional header extension is present, the SID field is located between the additional header and optional header extension. The SID field may be included in link layer signaling.

The Header_Extension may include information for extensibility of the additional header. The Header_Extension may include an Extension_Type field, an Extension_Length field and/or an Extension_Byte element.

The Extension_Type field may be an 8-bit field indicating the type of Header_Extension 0.

Extension_Length field may be an 8-bit field indicating the byte length of Header_Extension ( ) which is counted from the next byte to the last byte of Header_Extension ( ).

The Extension_Byte element may indicate the value of Header_Extension ( ).

FIG. 14 illustrates a structure and syntax of an additional header of a link layer packet in the case of segmentation according to an embodiment of the present invention.

When Segmentation_Concatenation (S/C)="0", an additional header (referred to as an additional header for segmentation) for a link layer packet may be present in the case of segmentation.

The additional header for segmentation may include a Segment_Sequence_Number field, a Last_Segment_Indicator (LSI) field, a Sub-stream Identifier Flag (SIF) field, an HEF field, an SID field and/or Header_Extension ( ).

The Segment_Sequence_Number field may be a 5-bit unsigned integer indicating a segmentation order delivered by the link layer packet. The Segment_Sequence_Number field may be set to 0x0 for the link layer packet delivering the first segment of an input packet. The Segment_Sequence_Number field may increment for each segment belonging to the input packet to be segmented.

The LSI field may be a 1-bit field indicating that a segment present in a relevant payload is the last segment of the input packet when set to 1. An LSI field value of 0 may indicate that the segment is not the last segment.

The SIF field may be a 1-bit field indicating that SID follows the HEF field. When the SID is not present in the link layer packet, the SIF field may be set to 0. When the SID follows the HEF field in the link layer packet, the SIF field may be set to 1.

The HEF field may be a 1-bit field indicating that optional header extension is present after the additional header for future extension of a link layer header when set to 1. An HEF field value of 0 may indicate that optional header extension is not present.

Description of the SID field and/or Header_Extension ( ) is replaced by the above description.

A packet ID field indicating that segments are generated from the same input packet may be added according to embodiment. This field may be omitted when segments are not sequentially delivered.

Figure 15:
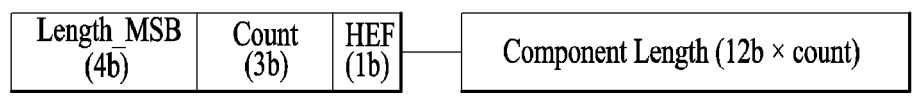
FIG. 15 illustrates a structure and syntax of the additional header of the link layer packet in the case of concatenation according to an embodiment of the present invention.

FIG. 15 illustrates a structure and syntax of an additional header of a link layer packet in the case of concatenation according to an embodiment of the present invention.

When Segmentation_Concatenation (S/C)="1", an additional header (referred to as an additional header for concatenation hereinafter) of a link layer packet may be present in the case of concatenation.

The additional header for concatenation may include a Length MSB field, a Count field, an HEF field, a Component_Length field and/or Header_Extension.

The Length_MSB field may be a 4-bit field indicating MSBs of a payload length in bytes in the link layer packet. A maximum length of the payload becomes 32,767 bytes for concatenation. The numerical value may be changed as described above.

The count field may indicate the number of packets (input packets) included in the link layer packet. The counter field may be set to 2, corresponding to the number of packets included in the link layer packet. Accordingly, the maximum number of packets concatenated in the link layer packet is 9. A method of indicating the number of packets by the count field may be changed according to embodiments. That is, 1 to 8 may be indicated.

The HEF field may be a 1-bit field indicating that optional header extension is present after the additional header for future extension of a link layer header when set to 1. An HEF field value of 0 may indicate that header extension is not present.

The Component_Length field may be a 12-bit field indicating the length of each packet in bytes. Component_Length fields are included in the same order as packets present in a payload except for the last component packet. The number of Component_Length fields may be indicated by (Count+1). The same number of Component_Length fields as Count fields may be present according to embodiment. When the link layer header includes odd-numbered Component_Length fields, four stuffing bits may follow the last Component_Length field. These bits may be set to 0. The Component_Length field indicating the length of the last concatenated input packet may be present according to embodiment. In this case, the length of the last concatenated input packet may be indicated by a value obtained by subtracting the sum of values indicated by respective Component_Length fields from the total payload length.

The aforementioned SID field and/or Header_Extension may be included in the link layer packet in the form of an optional header.

Figure 16:
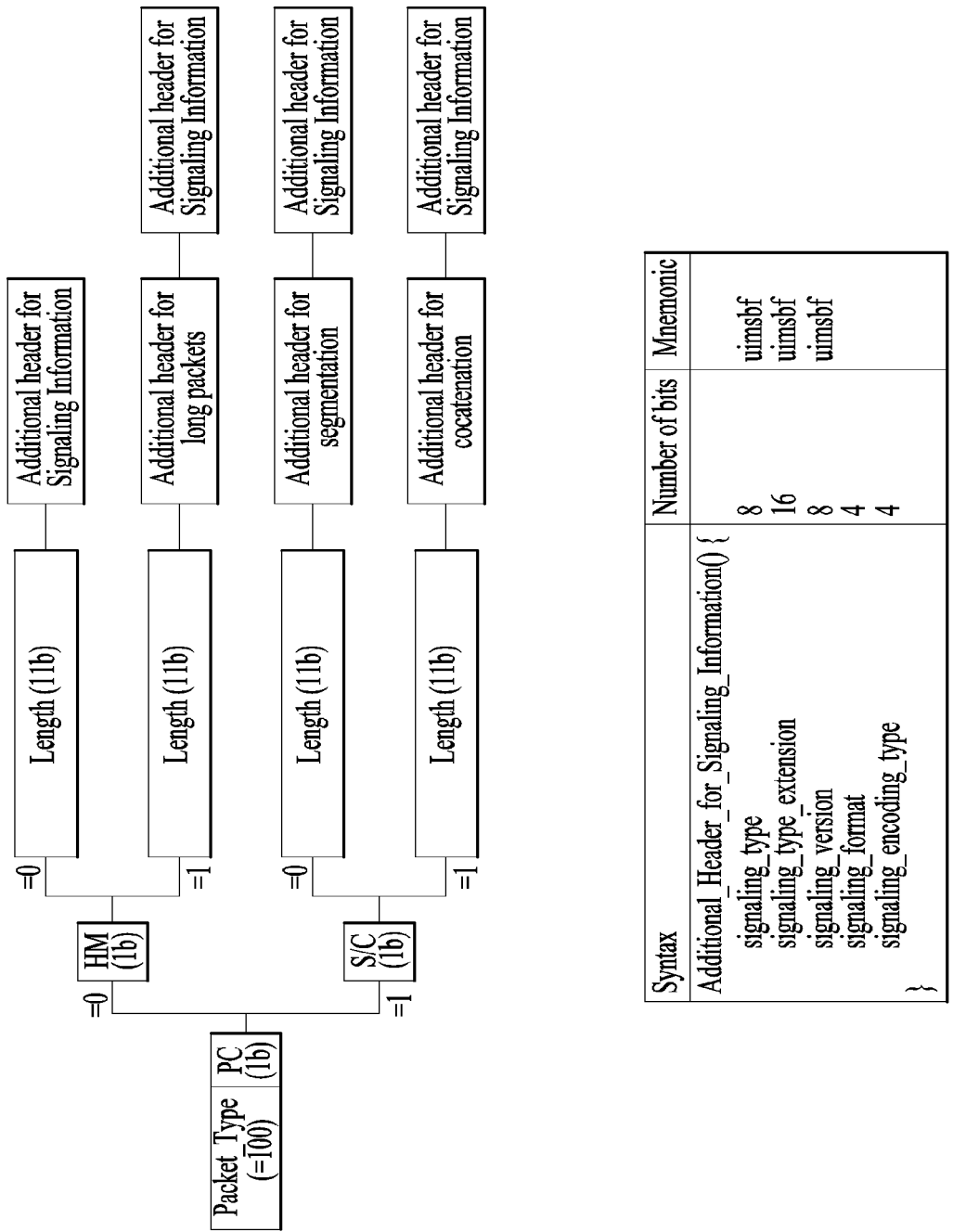
FIG. 16 illustrates a link layer packet including link layer signaling and a syntax of an additional header included therein according to an embodiment of the present invention.

FIG. 16 illustrates a link layer packet including link layer signaling and syntax of an additional header included therein according to an embodiment of the present invention.

Link layer signaling is included in the link layer packet in the following manner. A signaling packet is identified when the Packet_Type field of a base header is 100.

The link layer packet may include two additional parts, an additional header for signaling information and actual signaling data. The total length of the link layer signaling packet is indicated by a link layer packet header.

The additional header for signaling information may include the following fields. Part of the fields may be omitted according to embodiment.

A signaling_Type field may be an 8-bit field indicating a signaling type.

A signaling_Type_Extension field may be a 16-bit field indicating a signaling attribute. Detailed contents of this field may be defined in signaling specifications.

Signaling_Version may be an 8-bit field indicating a signaling version.

Signaling_Format may be a 2-bit field indicating a data format of signaling data. Here, a signaling format may refer to a data format such as binary, XML, ATSC, table and descriptor.

Signaling_Encoding_Type may be a field indicating an encoding/compression format. This field may indicate whether compression has not been performed and whether specific compression has been performed. This field may indicate whether signaling information (signaling data) has been encoded through gzip, zip or DEFLATE according to the value thereof.

Figure 17:
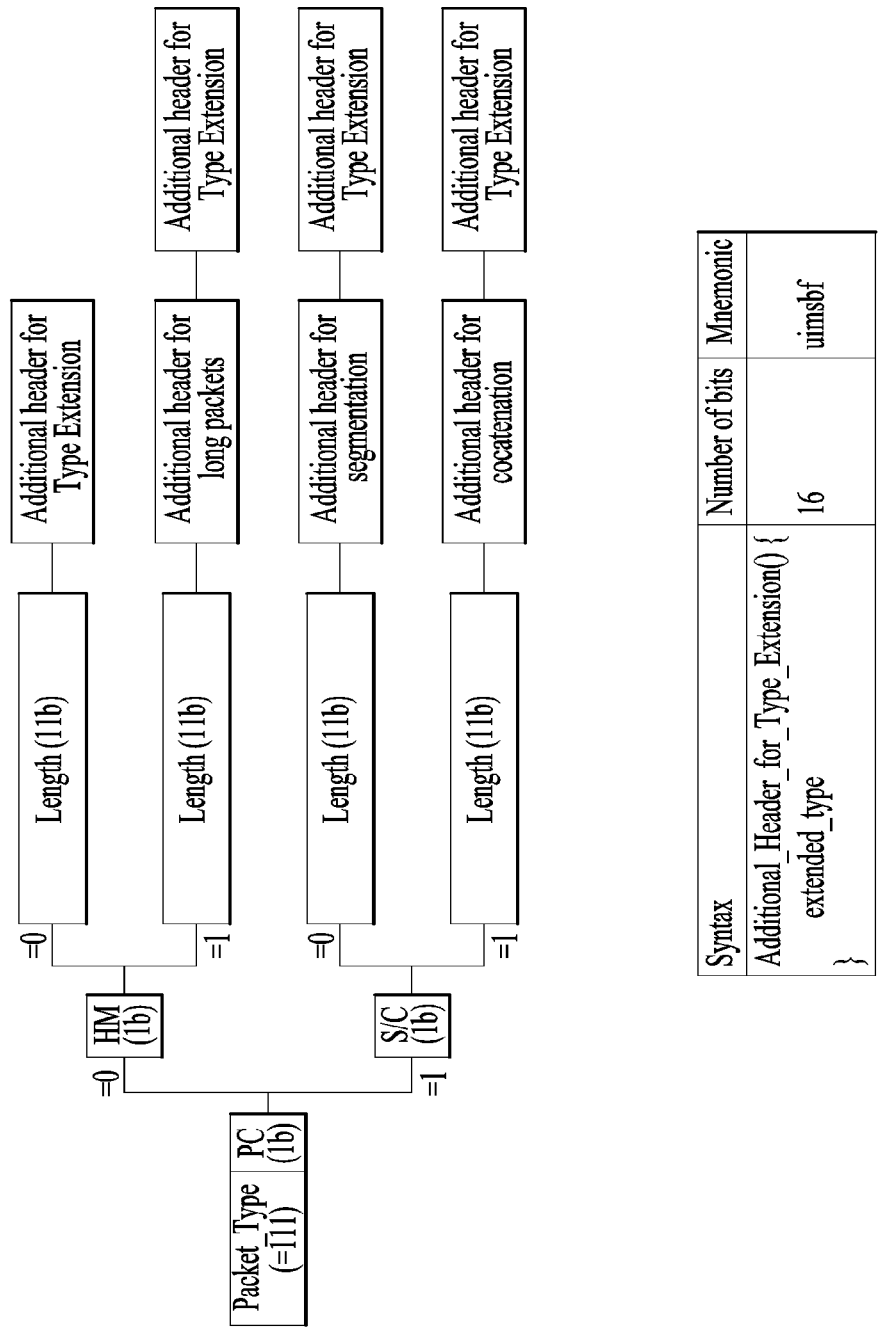
FIG. 17 illustrates a link layer packet including an extended packet (input packet) and syntax of an additional header included therein according to an embodiment of the present invention.

FIG. 17 illustrates a link layer packet including an extended packet (input packet) and a syntax of an additional header included therein according to an embodiment of the present invention.

To provide a mechanism for permitting a nearly unlimited number of packet types and additional protocols delivered by a link layer in the future, an additional header may be defined. When the Packet_type of the base header is 111, packet type extension may be used, as described above. The figure illustrates a structure of a link layer packet including an additional header for type extension to a link layer packet including an input packet using a protocol different from the aforementioned protocols, which will be added in the future.

The additional header for type extension may include the following fields. Part of the fields may be omitted according to embodiment.

An extended_type field may be information, which indicates a protocol or packet type of an input packet encapsulated into a link layer packet, as a payload. This field may not be used for protocols or packet types which have been defined by the Packet_Type field.

Figure 18:
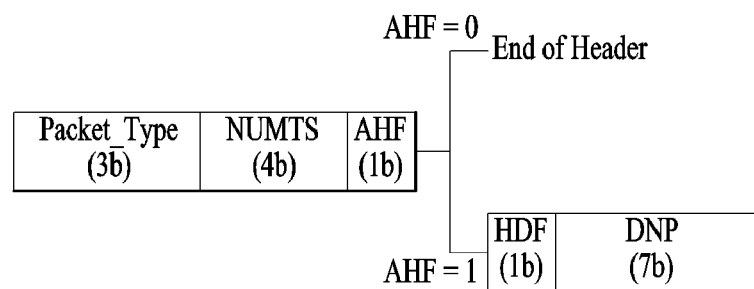
FIG. 18 illustrates a link layer packet including an MPEG2-TS packet and syntax of a link layer packet header according to an embodiment of the present invention.

FIG. 18 illustrates a link layer packet including an MPEG2-TS packet and a syntax of a header of the link layer packet according to an embodiment of the present invention.

When the Packet_Type field of the base header is 010, the link layer packet may include an MPEG2-TS packet. One or more TS packets may be encapsulated in each link layer packet. The number of TS packets may be signaled through a NUMTS field. In this case, a special link layer packet header format may be used, as described above.

The link layer provides an overhead reduction mechanism for MPEG-2 TSs in order to improve transmission efficiency. A sync byte (0x47) of each TS packet may be deleted. An option of deleting a null packet and a similar TS header is provided.

To avoid, unnecessary transmission overhead, a TS null packet (e.g. a TS packet having PID=0x1FFF) may be deleted. The deleted null packet may be restored using a DNP field in a receiver. The DNP field indicates a count of deleted null packets. A null packet deletion mechanism using the DNP field will be described below.

To further improve transmission efficiency, similar headers of MPEG-2 TS packets may be deleted. When two or more sequential TS packets sequentially increase continuity counter (CC) fields and the header fields thereof are identical, the header is transmitted once in the first packet and other headers are deleted. An HDM field may indicate whether the header has been deleted. A common TS header deletion process will be described in detail below. Here, the CC field may be included in the header of an MPEG2-TS packet. The CC field is information indicating a sequence number of payloads of TS packets within the range of a stream.

When all three overhead reduction mechanisms are executed, overhead reduction may be performed in the order of sync removal, null packet deletion and common header deletion. The mechanism execution order may be changed according to embodiment. In addition, some mechanisms may be omitted according to embodiment.

The figure illustrates the header of the link layer packet when MPEG-2 TS packet encapsulation is used. When MPEG-2 TS packet encapsulation is used, the header of the link layer packet may include a Packet_Type field, a number of TS packets (NUMTS) field, an additional header flag (AHF) field, a header deletion mode (HDM) field and/or a deleted null packets (DNP) field.

The Packet_Type field may be a 3-bit field indicating a protocol type of an input packet, as described above. This field may be set to 010 for MPEG-2 TS packet encapsulation.

The NUMTS field may be a 4-bit field indicating the number of TS packets in the payload of the relevant link layer packet. A maximum of 16 TS packets may be supported by one link layer packet. NUMTS=0 may indicate that 16 TS packets are delivered by the payload of the link layer packet. For all other NUMTS values, the same number of TS packets as the NUMTS value corresponding thereto is recognized. For example, NUMTS=0001 indicates that one TS packet is delivered.

The AHF field may indicate presence or absence of the additional header. An AHF field value of 0 indicates absence of the additional header. An AHF field value of 1 indicates that a 1-byte additional header follows a base header. When a TS packets is deleted or TS header compression is applied, the AHF field may be set to 1. The additional header for TS packet encapsulation includes the following two fields and is present only when the AHF field is set to 1 in the link layer packet.

The HDM field may be a 1-bit field indicating whether TS header deletion is applicable to the link layer packet. An HDM field value of 1 indicates that TS header deletion is applicable and an HDM field value of 0 indicates that TS header deletion is not applied to the link layer packet.

The DNP field may be a 7-bit field indicating the number of TS packets deleted before the link layer packet. A maximum of 128 null TS packets may be deleted. When HDM=0, DNP=0 may indicate deletion of 128 null packets. When HDM=1, DNP=0 may indicate that no null packet is deleted. For all other DNP values, the same number of null packets as the DNP value corresponding thereto is recognized. For example, DNP=5 refers to deletion of 5 null packets.

The number of bits of each field may be changed and the minimum/maximum value indicated by a field may be changed according to the changed number of bits of the field. The number of bits and the minimum/maximum value may be changed by the designer.

A description will be given of sync byte removal.

When a TS packet is encapsulated into a payload of a link layer packet, the sync byte (0x47) may be deleted from the start of the TS packet during data processing in the link layer. Accordingly, the length of an MPEG2-TS packet encapsulated into a payload of a link layer packet may become 187 bytes (instead of the original length of 188 bytes).

Figure 19:
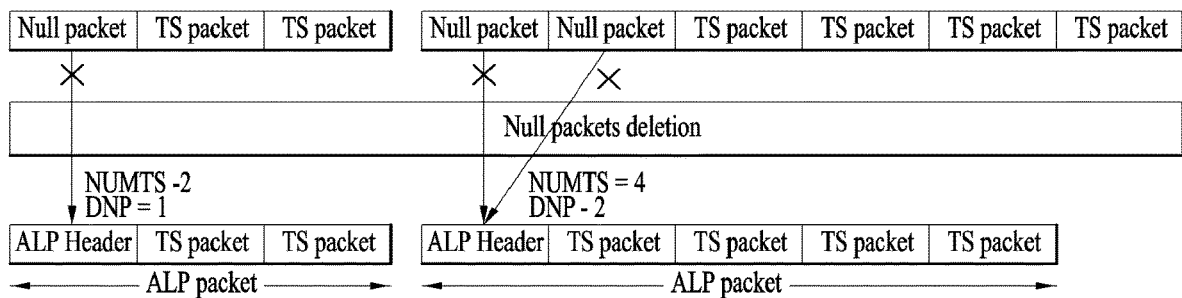
FIG. 19 illustrates a process of removing null packets from MPEG2-TS packets according to an embodiment of the present invention.

FIG. 19 illustrates a process of removing null packets from MPEG2-TS packets according to an embodiment of the present invention.

Transport stream regulation requires bitrates of the output of a multiplexer of a transmitter and the input of a demultiplexer of a receiver to be uniform with respect to time and requires uniform end-to-end delay. For some transport stream input signals, null packets may be present in order to apply a variable bitrate service to streams having a uniform bitrate. In this case, a TS null packet (i.e. a TS packet having PID=0x1FFF) may be removed through link layer processing in order to avoid unnecessary transmission overhead. Such processing is performed in such a manner that a deleted null packet can be re-inserted into the original position in a receiver, and thus a uniform bitrate is secured and PCR timestamp update is not needed.

Before generation of a link layer packet, a counter called DNP is reset to 0 and may then be incremented by 1 for each deleted null packet prior to a packet that is not the first null TS packet to be encapsulated into the payload of the current link layer packet. Thereafter, a group of continuous valid TS packets may be encapsulated into the payload of the current link layer packet and values of fields in the header thereof may be determined. After the generated link layer packet is inserted into a physical layer, DNP is reset to 0. When DNP reaches a maximum limit, if the next packet is a null packet, the null packet is maintained as a valid packet and encapsulated into the payload of the next link layer packet. Each link layer packet may include at least one TS packet in the payload thereof.

The figure illustrates a null packet deletion process when the HDM field is "0" and the AHF field is "1". Referring to the figure, a single null packet is deleted prior to transmission of two valid TS packets in the first link layer packet. The packet following the valid TS packets included in the first link layer packet may be a null packet. Accordingly, the first link layer packet is completed and the DNP counter may be reset to 0 for the next link layer packet. In this case, in the header of the first link layer packet, the NUMTS filed may be set to "2" and the DNP field may be set to "1". In the second link layer packet, 2 null packets are deleted prior to 4 valid TS packets. In this case, the NUMTS field may be set to "4" and the DNP field may be set to "2" in the second link layer packet.

Figure 20:
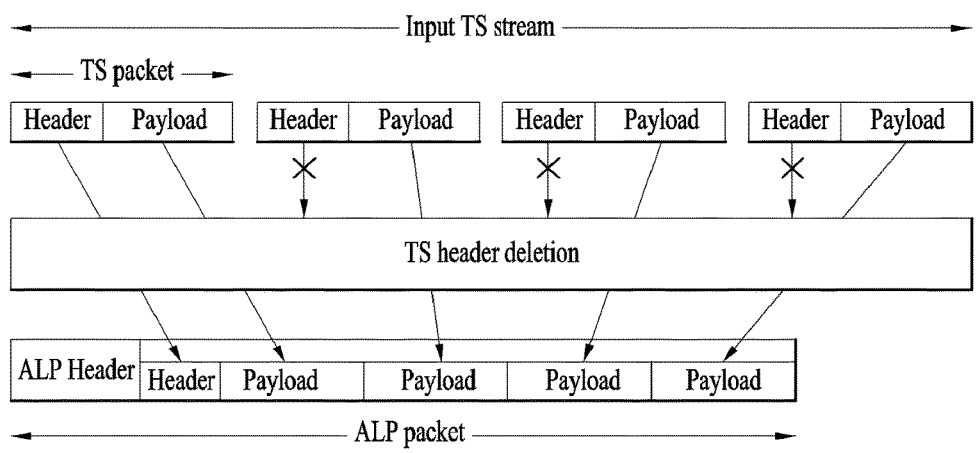
FIG. 20 illustrates a process of deleting headers from MPEG2-TS packets according to an embodiment of the present invention.

FIG. 20 illustrates a process of deleting headers from MPEG2-TS packets according to an embodiment of the present invention.

TS packet header deletion may be called TS packet header compression.

When two or more sequential TS packets sequentially increase their CC fields and have the same field values in the headers thereof, except for the CC field, the header of the first TS packet is transmitted and other headers may be deleted.

The aforementioned HDM field may indicate whether the header has been deleted. When the header of a TS packet is deleted, the HDM field may be set to 1.

Referring to the figure, three TS packets have the same header (header having the same fields except for the CC field) as that of the first TS packet. In this case, the NUMTS field may be set to "4", the HDM field may be set to "1", the DNP field may be set to "0" and the AHF field may be set to "1" in the link layer packet. In a receiver, deleted headers of TS packets other than the first TS packets may be restored using the header, which is included in the payload of the link layer packet, of the first TS packets. The CC fields of the TS packets sequentially increase from the first TS packet such that the headers of the TS packets are restored.

FIG. 21 illustrates a single packet encapsulation structure of a link layer according to an embodiment of the present invention.

FIG. 21(a) illustrates an encapsulation structure of a short single packet. The short packet may include a Packet_Type field, a PC field, an HM field, a Length field and/or a payload, which have been described above.

FIG. 2(b) illustrates an encapsulation structure of a long single packet. The long packet may include a Packet_Type field, a PC field, an HM field, a Length field, a Length_MSB field, a Reserved (R) field, an SIF field, an HEF field and/or a payload, which have been described above. The long packet may include an SID field and/or an optional header.

Figure 22:
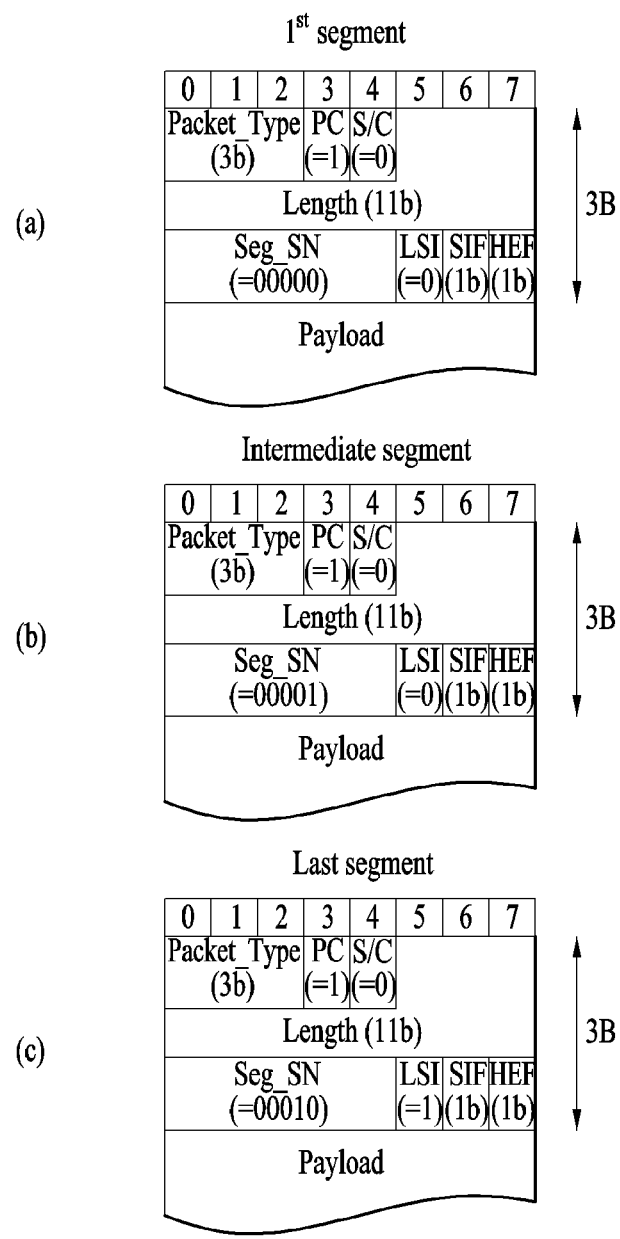
FIG. 22 illustrates a link layer packet encapsulation structure to which segmentation is applied according to an embodiment of the present invention.

FIG. 22 illustrates an encapsulation structure of a link layer packet to which segmentation is applied according to an embodiment of the present invention.

FIG. 22(a) illustrates a link layer packet including a first segment of an input packet. In this case, the link layer packet may include a Packet_Type field, a PC field, an S/C field, a Length field, a Seg_SN field, an LSI field, an SIF field, an HEF field and/or a payload, which have been described above.

FIG. 22(b) illustrates a link layer packet including an intermediate segment of the input packet. In this case, the link layer packet may include a Packet_Type field, a PC field, an S/C field, a Length field, a Seg_SN field, an LSI field, an SIF field, an HEF field and/or a payload, which have been described above.

FIG. 22(c) illustrates a link layer packet including the last segment of the input packet. In this case, the link layer packet may include a Packet_Type field, a PC field, an S/C field, a Length field, a Seg_SN field, an LSI field, an SIF field, an HEF field and/or a payload, which have been described above.

Figure 23:
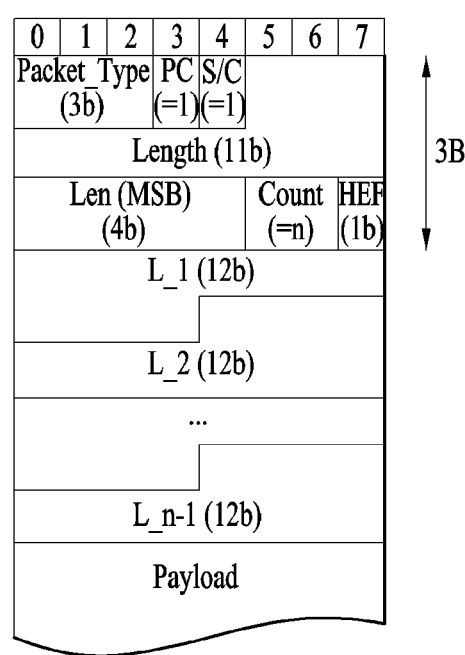
FIG. 23 illustrates a link layer packet encapsulation structure to which concatenation is applied according to an embodiment of the present invention.

FIG. 23 illustrates an encapsulation structure of a link layer packet to which concatenation is applied according to an embodiment of the present invention.

The link layer packet including a plurality of input packets may include a Packet_Type field, a PC field, an S/C field, a Length field, a Length_MSB field, a Count field, an HEF field, fields (L_1, L_2, . . . , L_n−1 fields) indicating the respective lengths of the input packets and/or a payload, which have been described above.

Figure 24:
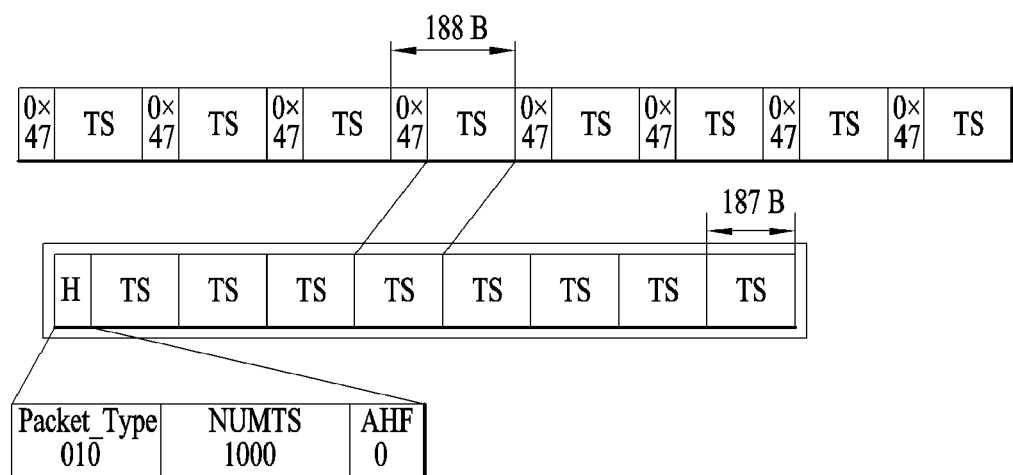
FIG. 24 illustrates the concept of MPEG2-TS packet encapsulation in a link layer according to an embodiment of the present invention.

FIG. 24 illustrates the concept of encapsulation of an MPEG2-TS packet in a link layer according to an embodiment of the present invention.

As described above, a link layer packet may include one or more MPEG2-TS packets. Here, sync bytes of the MPEG2-TS packets may not be included in the payload of the link layer packet. Referring to the figure, one link layer packet includes 8 MPEG2-TS packets. A process of encapsulating the 8 MPEG2-TS packets into a single link layer packet may include a process of deleting sync bytes for the MPEG2-TS packets. When the sync bytes are deleted from the MPEG2-TS packets, the link layer packet may carry 187 bytes, instead of 188 bytes, for one MPEG2-TS packet. The 8 MPEG2-TS packets are included in the payload of one link layer packet. In this case, the length of the payload of the link layer packet may be 187*8=1,496 bytes. The header of the link layer packet is generated by setting the aforementioned field values in the header of the link layer packet.

Referring to the figure, the Packet_Type field may be set to "010", the NUMTS field may be set to "1000" and the AHF field may be set to "0".

According to the present embodiment, throughput of 7 bytes can be reduced through link layer processing, compared to direct transmission of 8 MPEG2-TS packets to the physical layer.

Figure 25:
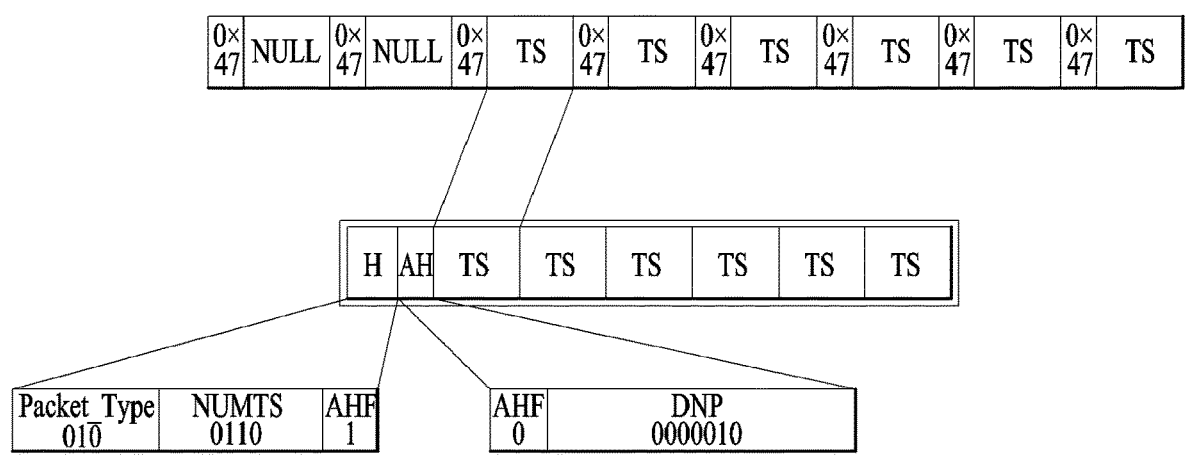
FIG. 25 illustrates the concept of MPEG2-TS packet encapsulation in the link layer using null packet removal according to an embodiment of the present invention.

FIG. 25 illustrates the concept of encapsulation of an MPEG2-TS packet in a link layer using null packet deletion according to an embodiment of the present invention.

Link layer processing may include a process of deleting null MPEG2-TS packets present prior to the first MPEG2-TS packet included in a link layer packet. In this case, a transmitter may notify a receiver of the number of deleted null MPEG2-TS packets using the header of the link layer packet.

The figure illustrates an embodiment in which a link layer packet includes 6 MPEG2-TS packets and 2 null MPEG2-TS packets prior to the first MPEG2-TS packet in the payload of the link layer packet are deleted.

For null packet deletion, a broadcast system deletes null packets from input packets and counts the number of deleted null packets. The broadcast system deletes sync bytes included in the MPEG2-TS packets. The broadcast system includes the 6 MPEG2-TS packets in the payload of the link layer packet. The broadcast system generates a link layer packet header suitable for the present embodiment. In the header, the Packet_Type field may be set to "010", the NUMTS field may be set to "0110", the AHF field may be set to "1" (this value may indicate presence of deleted null packets prior to the first MPEG2-TS packet encapsulated into the payload of the link layer packet), the HCM field may be set to "0" and the DNP field may be set to "0000010".

According to the present embodiment, the broadcast system can appropriately process the MPEG2-TS packets through link layer processing while reducing 380 bytes, compared to direct transmission of 8 MPEG2-TS packets to the physical layer.

Figure 26:
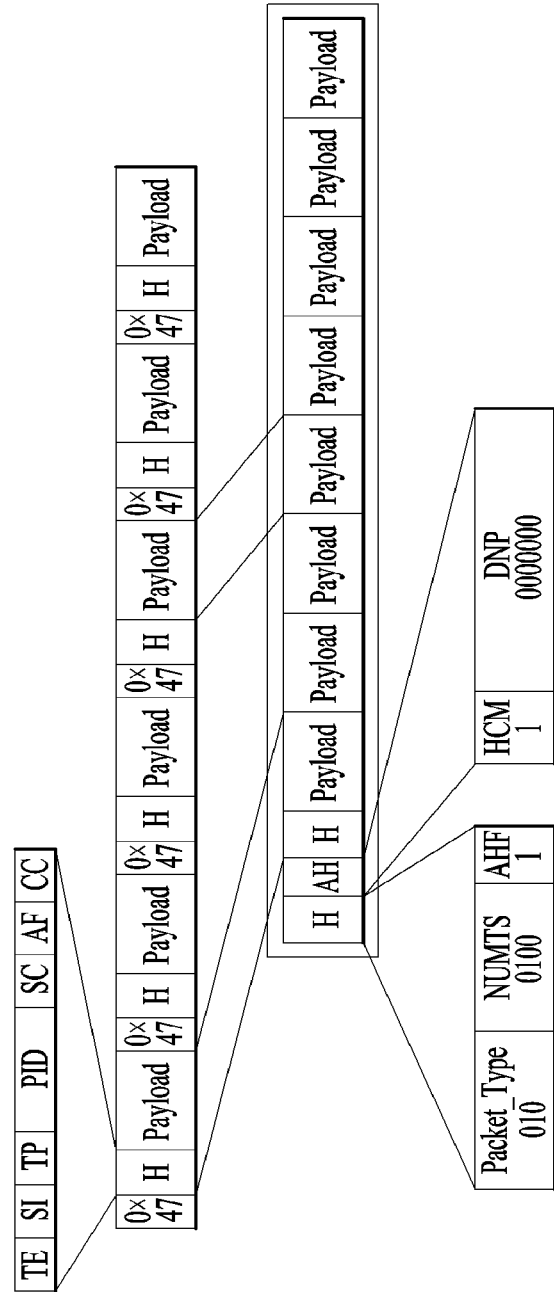
FIG. 26 illustrates the concept of MPEG2-TS packet encapsulation in the link layer using TS header removal according to an embodiment of the present invention.

FIG. 26 illustrates the concept of encapsulation of an MPEG2-TS packet in the link layer using TS header deletion according to an embodiment of the present invention.

Link layer packets may be generated in the link layer by performing additional compression on MPEG2-TS packets in addition to the aforementioned sync byte deletion and/or null packet deletion.

Referring to the figure, headers of 8 MPEG2-TS packets may include fields having the same values except for the CC field. Link layer processing for compressing MPEG2-TS packet headers in the link layer, performed by a broadcast system, may include the following process. The broadcast system may group the 8 TS packets (the number of TS packets may be changed) including headers having the same field values except for the CC field. The broadcast system may maintain the header of the first MPEG2-TS packet, except for the sync bytes, and delete headers of the other 7 MPEG2-TS packets. The broadcast system may generate a header of a link layer packet. In the header of the link layer packet, the Packet_Type field may be set to "010", the NUMTS field may be set to "0100", the AHF field may be set to "1", the HCM field may be set to "1" and the DNP field may be set to "0000000". The broadcast system may generate a link layer packet including part (part remaining after header compression) of the 8 MPEG2-TS packets. The generated link layer packet may have a length of 1,477 bytes, which is smaller, by 27 bytes, than the length when the 8 MPEG2-TS packets are directly transmitted through the physical layer. Accordingly, the present embodiment can decrease the quantity of data transmitted by the broadcast system.

Figure 27:
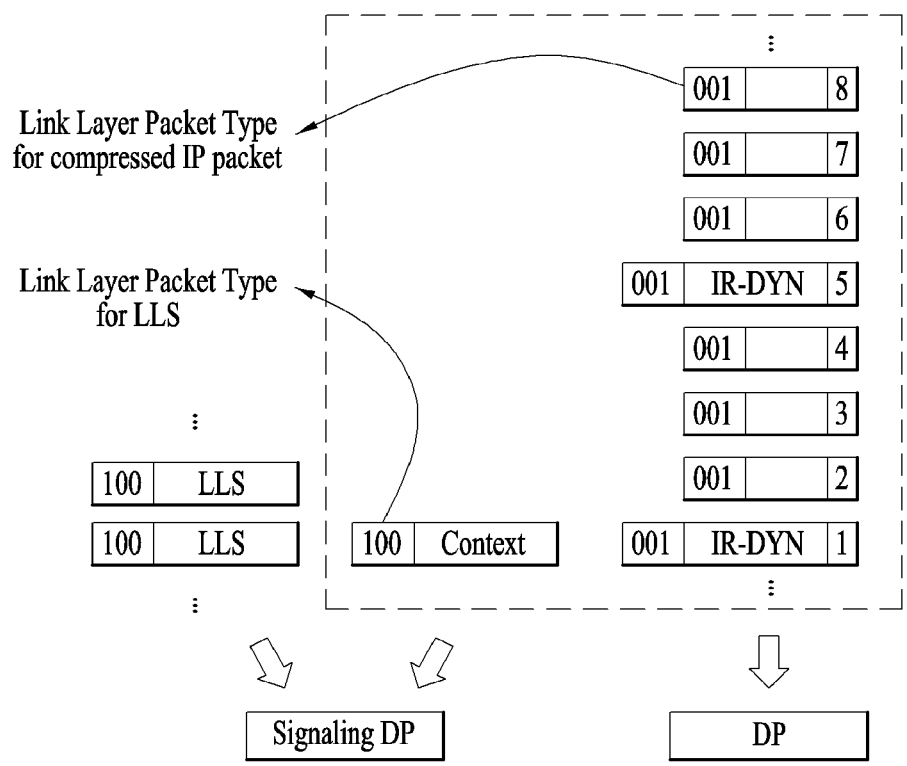
FIG. 27 illustrates a transmission path with respect to context when IP packet header compression in the link layer is performed according to an embodiment of the present invention.

FIG. 27 illustrates a transmission path with respect to context when IP packet header compression in the link layer is performed according to an embodiment of the present invention.

As described above, the present invention can reduce the quantity of data transmitted through a broadcast system by performing IP header compression when IP packets are delivered to the link layer as input packets. A context (or context information) generated during this process may be transmitted from a transmitter to a receiver through a path separated from a path for header-compressed IP packets.

When IP header compression is performed, if the receiver cannot directly acquire the context at the moment of channel change or power on, the receiver may not directly restore IP packets (header-compressed IP packets which may be referred to as "RoHC packets") for the relevant channel even if the IP packets are received. Accordingly, the context may be transmitted through a path different from a path for the header-compressed IP packets and the receiver may acquire the context through the path when channels are changed or power is on so as to directly restore the IP packets according to the present embodiment.

The path through which the context is transmitted may be a path through which signaling information is delivered. For example, when a PLP that delivers the signaling information is present, the PLP may deliver the context. Alternatively, the context transmission path may be pre-designated such that the receiver may receive the context by directly accessing the path.

Through the context transmission path, the same context may be repeatedly transmitted periodically or aperiodically such that receivers can directly acquire the context at the moment of channel change or power on since the receivers may have different channel change or power on timings.

Figure 28:
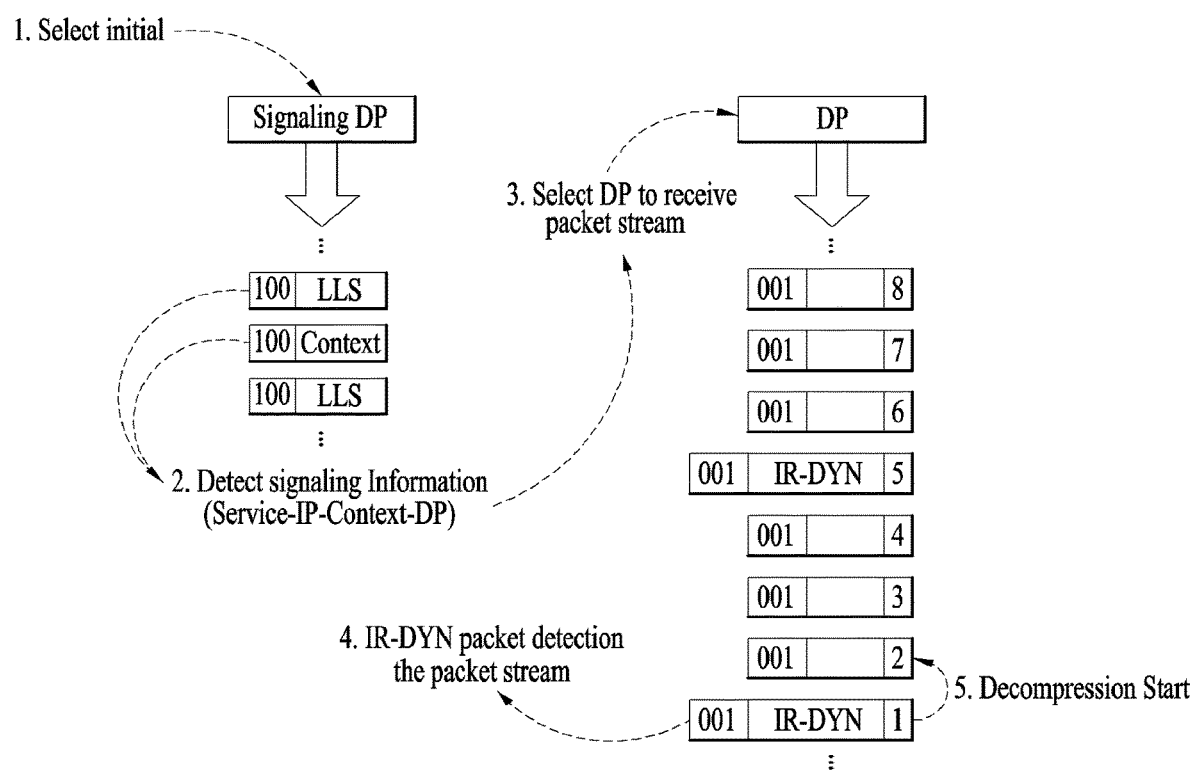
FIG. 28 illustrates a process of acquiring a context in a receiver according to an embodiment of the present invention.

FIG. 28 illustrates a process of acquiring a context in a receiver according to an embodiment of the present invention.

As described above, when the context is transmitted through a path different from a path for a stream carrying IP packets, a receiver may acquire signaling information first. That is, the receiver may acquire the context transmitted through a PLP (or DP) that carries the signaling information during a procedure for accessing the PLP to obtain the signaling information. After acquisition of the signaling information, the receiver may select a PLP for acquiring a stream carrying IP packets. During this procedure, the receiver may obtain the context prior to acquisition of the stream carrying IP packets. An adaptation module of the receiver may detect an IR-DYN packet from a received packet flow (a set of IP packets). The adaptation module may parse a static chain included in the context. This process is similar to a process of acquiring IP packets. IR-DYN packets having the same context identifier may be restored to IR packets. A restored RoHC packet flow may be transmitted to an RoHC restoration unit and restored to IP packets.

Figure 29:
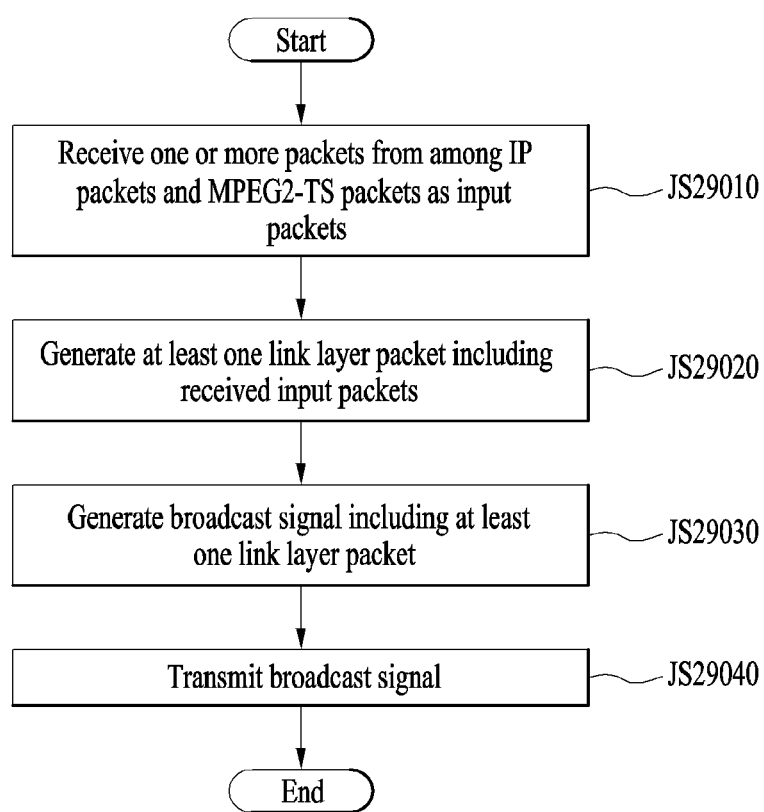
FIG. 29 is a flowchart illustrating a method of generating and processing a broadcast signal according to an embodiment of the present invention.

FIG. 29 is a flowchart illustrating a method of generating and processing a broadcast signal according to an embodiment of the present invention.

A transmitter receives one or more packets from among Internet protocol (IP) packets and MPEG2-TS packets as input packets (JS29010).

The transmitter generates at least one link layer packet including the received input packets (JS29020). In generation of the link layer packet, the transmitter may delete null packets from among the MPEG2-TS packets, delete sync bytes included in MPEG2-TS packets remaining after deletion of the null packets and generate the link layer packet including a header and a payload containing the MPEG2-TS packets from which sync bytes have been deleted.

The transmitter generates a broadcast signal including the at least one link layer packet (JS29030).

The transmitter transmits the broadcast signal (JS29040).

According to an embodiment of the present invention, the header of the link layer packet may include Packet_Type information that specifies the type of an input packet included in the payload of the link layer packet and NUMTS information that indicates the number of MPEG2-TS packets from which the sync bytes have been deleted, which are included in the payload of the link layer packet.

According to an embodiment of the present invention, the header of the link layer packet may further include DNP information that indicates the number of deleted null packets.

According to an embodiment of the present invention, the MPEG2-TS packets may include a first MPEG2-TS packet, a second MPEG2-TS packet and a third MPEG2-TS packet. The first MPEG2-TS packet may include a first MPEG2-TS packet header and a first MPEG2-TS packet payload, the second MPEG2-TS packet may include a second MPEG2-TS packet header and a second MPEG2-TS packet payload, and the third MPEG2-TS packet may include a third MPEG2-TS packet header and a third MPEG2-TS packet payload. The step of generating at least one link layer packet may include a step of deleting the second MPEG2-TS packet header and the third MPEG2-TS packet header when the second MPEG2-TS packet header and the third MPEG2-TS packet header include fields having the same values as those included in the first MPEG2-TS packet header, except for a continuity counter (CC) field, and a step of generating a link layer packet including a link layer packet payload containing the first MPEG2-TS packet header, the first MPEG2-TS packet payload, the second MPEG2-TS packet payload and the third MPEG2-TS packet payload, and the link layer packet header.

According to an embodiment of the present invention, the link layer packet header may include HDM information that indicates that the second MPEG2-TS packet header and the third MPEG2-TS packet header have been deleted.

According to an embodiment of the present invention, the step of generating at least one link layer packet may further include a step of generating link layer signaling information containing information for processing the link layer packets and a step of generating a link layer signaling packet including the generated link layer signaling information.

According to an embodiment of the present invention, the link layer signaling packet may include signaling type information that specifies the type of the link layer signaling information included in the link layer signaling packet, signaling version information that indicates the version of the link layer signaling information, signaling format information that specifies the data format of the link layer signaling information and signaling encoding type information that specifies an encoding format applied to data of the link layer signaling information.

Figure 30:
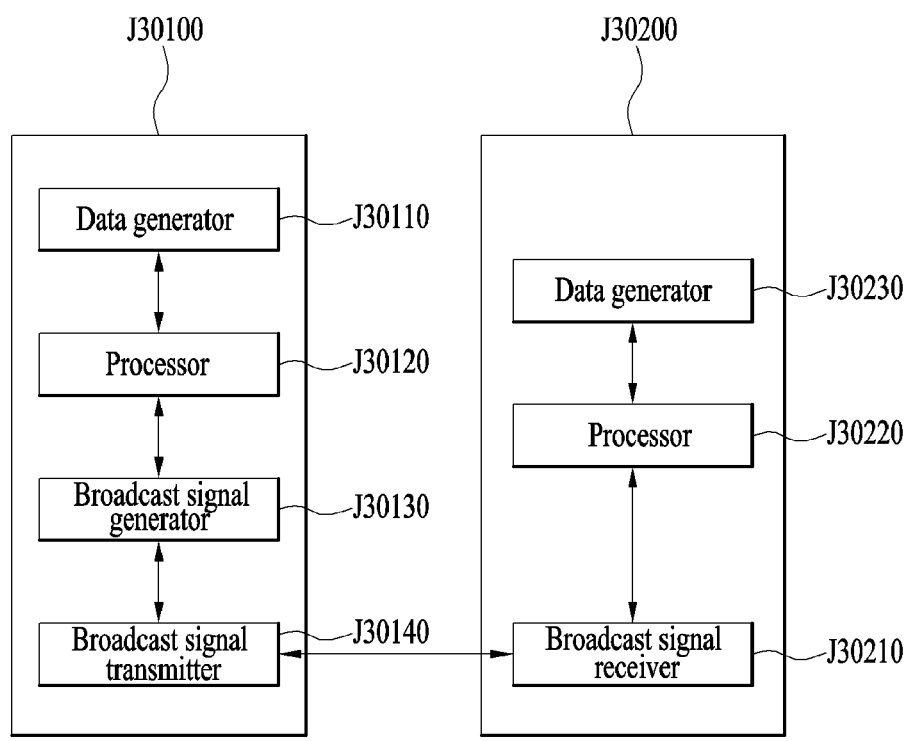
FIG. 30 illustrates a broadcast system according to an embodiment of the present invention.

FIG. 30 illustrates a broadcast system according to an embodiment of the present invention.

The broadcast system according to an embodiment of the present invention includes a transmitter J30100 and/or a receiver J30200.

The transmitter J30100 may include a data generator J30110, a processor J30120, a broadcast signal generator J30130 and/or a broadcast signal transmitter J30140.

The data generator J30110 generates data for broadcast content provided by the broadcast system.

The processor J30120 receives one or more packets from among IP packets and MPEG2-TS packets as input packets and generates at least one link layer packet including the received input packets. Here, the processor J30120 may delete null packets from among MPEG2-TS packets, delete sync bytes included in MPEG2-TS packets remaining after deletion of the null packets and generate a link layer packet including a header and a payload containing the MPEG2-TS packets from which sync bytes have been deleted. The processor J30120 may include a signaling encoder (not shown). The signaling encoder encodes or generates the aforementioned signaling information. The signaling information includes low level signaling, a service list table, service layer signaling, an MPD, an MP table, copy control information and/or metadata of ISOBMFF, as described above.

The broadcast signal generator J30130 generates a broadcast signal including the at least one link layer packet.

The broadcast signal transmitter J30140 transmits the broadcast signal.

The receiver J43200 includes a signal receiver J43210, a processor J43220 and/or a display J43230.

The signal receiver J30210 receives a broadcast signal or a broadband signal.

The processor J30220 restores IP packets and/or MPEG2-TS packets that may be included in link layer packets by performing processing corresponding to the aforementioned link layer processing applied to the IP packets and/or MPEG2-TS packets. That is, when headers of IP packets included in link layer packets have been compressed, the processor J30220 decompresses the compressed headers to restore input packets input to a link layer of a transmitting side. When header compression, null packet deletion and/or sync byte deletion have been performed on MPEG2-TS packets included in link layer packets, the processor J30220 performs restoration of compressed headers, null packets and sync bytes to restore input packets input to the link layer of the transmitting side. The processor J30220 may decode the signaling information. The processor J30220 processes the signaling information and data constituting broadcast content to decode the signaling information and data into data for media presentation.

The display J30230 presents media using the decoded data.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method for transmitting a broadcast signal in a transmitter, the method comprising:
processing a link layer packet,
wherein the link layer packet includes a header and a payload, the header includes a base header, the base header includes packet type information for representing a first packet type, and segmentation concatenation information for representing that the payload carries a segment of a single input packet or multiple input packets,
when the packet type information is used to represent a packet type extension, the header further includes an additional header for type extension, the additional header for type extension includes extended type information for representing a second packet type, and the extended type information is used for the second packet type different from the first packet type which is represented by the packet type information, and
when the payload carries the multiple input packets, the header further includes an additional header for concatenation, the additional header for concatenation includes count information for representing a number of the multiple input packets included in the link layer packet, and a value of the count information is set to a number of the multiple input packets included in the link layer packet subtracted by two; and
transmitting the broadcast signal.

2. The method according to claim 1, wherein the base header further includes:
a packet configuration information for representing a configuration of the payload,
one bit information following the packet configuration information, and
length information for representing least significant bits of a length of the payload.

3. The method according to claim 2, when the packet configuration information is set to a first value, the one bit information is used to represent that the link layer packet carries the single input packet.

4. The method according to claim 1, when the packet type information represents link layer signaling, the header further includes an additional header for signaling information, and
the additional header for the signaling information includes:
signaling type information for representing a type of the signaling information,
signaling version information for representing a version of the signaling information,
signaling format information for representing data format of the signaling information, and
signaling encoding information for signaling encoding format.

5. A transmitter for transmitting a broadcast signal, the transmitter comprising:
a processor configured to process a link layer packet,
wherein the link layer packet includes a header and a payload, the header includes a base header, the base header includes packet type information for representing a first packet type, and segmentation concatenation information for representing that the payload carries a segment of a single input packet or multiple input packets,
when the packet type information is used to represent a packet type extension, the header further includes an additional header for type extension, the additional header for type extension includes extended type information for representing a second packet type, and the extended type information is used for the second packet type different from the first packet type which is represented by the packet type information, and
when the payload carries the multiple input packets, the header further includes an additional header for concatenation, the additional header for concatenation includes count information for representing a number of the multiple input packets included in the link layer packet, and a value of the count information is set to a number of the multiple input packets included in the link layer packet subtracted by two; and a broadcast signal transmitter configured to transmit the broadcast signal.

\* \* \* \* \*